United States Patent
Georgiades

(10) Patent No.: US 11,997,444 B2
(45) Date of Patent: May 28, 2024

(54) DEVICE FOR CHARGING ELECTRONIC DEVICES AND IN-EAR HEADPHONES

(71) Applicant: Molonlave Group LLC, Long Island City, NY (US)

(72) Inventor: Marios Georgiades, Saddle River, NJ (US)

(73) Assignee: Molonlave Group LLC, Long Island City, NY (US)

( * ) Notice: Subject to any disclaimer, the term of this patent is extended or adjusted under 35 U.S.C. 154(b) by 0 days.

(21) Appl. No.: 17/208,589

(22) Filed: Mar. 22, 2021

(65) Prior Publication Data
US 2021/0297764 A1     Sep. 23, 2021

Related U.S. Application Data

(60) Provisional application No. 62/993,242, filed on Mar. 23, 2020.

(51) Int. Cl.
*H04R 1/10* (2006.01)
*H02J 7/00* (2006.01)
*H04R 1/02* (2006.01)

(52) U.S. Cl.
CPC .......... *H04R 1/1025* (2013.01); *H02J 7/0042* (2013.01); *H04R 1/02* (2013.01); *H04R 1/1016* (2013.01); *H04R 2420/07* (2013.01)

(58) Field of Classification Search
CPC ...... H04R 1/1025; H04R 1/02; H04R 1/1016; H04R 2420/07; H02J 7/0042
See application file for complete search history.

(56) References Cited

U.S. PATENT DOCUMENTS

| | | |
|---|---|---|
| D814,412 S | 4/2018 | Georgiades |
| D816,026 S | 4/2018 | Georgiades |
| D816,606 S | 5/2018 | Georgiades |
| 2013/0251171 A1* | 9/2013 | Liu ...................... H04R 1/1025 381/74 |
| 2014/0270234 A1* | 9/2014 | Beal ..................... H04R 1/1025 381/74 |

(Continued)

OTHER PUBLICATIONS

Rushcharge, "Products—Rush Charge," https://rushcharge.com/collections/all, retrieved Sep. 17, 2018, 4 pages.

(Continued)

*Primary Examiner* — Jason R Kurr
(74) *Attorney, Agent, or Firm* — Ryan, Mason & Lewis, LLP

(57) ABSTRACT

An electronic device includes a housing, a male connector disposed on the housing, and a battery in the housing and electrically connected to the male connector. At least one cavity is formed in the housing, wherein a portion of the cavity includes a contact electrically connected to the battery. The male connector is configured for connecting to a second electronic device, and the at least one cavity is configured for receiving an in-ear wireless headphone. The battery is configured for simultaneously charging the second electronic device and the in-ear wireless headphone when the second electronic device is connected to the electronic device via the male connector, and the in-ear wireless headphone is positioned in the cavity.

20 Claims, 11 Drawing Sheets

(56) References Cited

U.S. PATENT DOCUMENTS

| | | | |
|---|---|---|---|
| 2015/0078575 A1* | 3/2015 | Selig | H04R 1/1025 381/74 |
| 2015/0245126 A1* | 8/2015 | Shaffer | H04R 1/1025 381/74 |
| 2017/0339482 A1* | 11/2017 | Schrems | H04M 1/0274 |
| 2018/0091887 A1* | 3/2018 | Minoo | H04R 1/1025 |
| 2020/0029149 A1* | 1/2020 | Nielsen | H04R 1/1025 |
| 2021/0250708 A1* | 8/2021 | Kheraj | H02J 7/0044 |
| 2023/0084210 A1* | 3/2023 | Kheraj | H04R 1/1016 381/74 |

OTHER PUBLICATIONS

Rushcharge, "Rush Charge—The Best Portable Battery Bank," https://rushcharge.com, 2021, 8 pages.
Design U.S. Appl. No. 29/728,519 filed in the name of Marios Georgiades on Mar. 19, 2020 and entitled "Electronic Device."

* cited by examiner

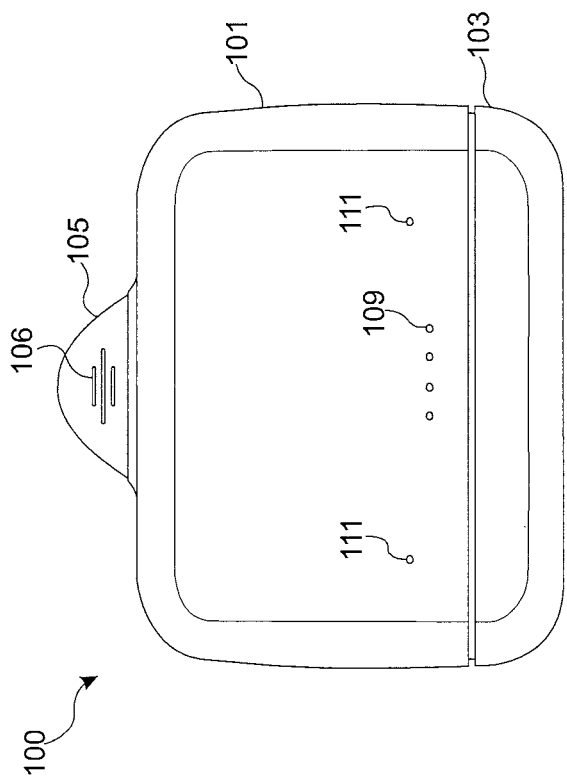
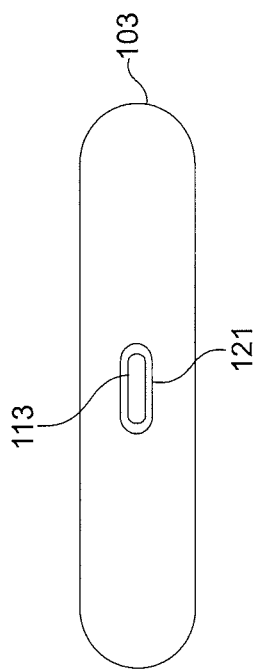
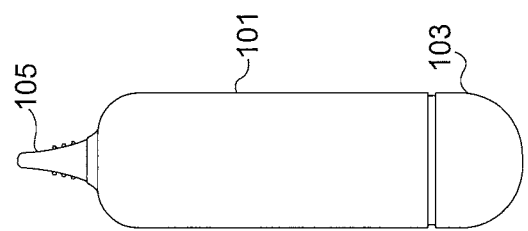

DEVICE FOR CHARGING ELECTRONIC DEVICES AND IN-EAR HEADPHONES

FIELD

The field relates generally to devices used to charge headphones and electronic devices, such as, for example, portable electronic devices, including but not necessarily limited to, mobile phones, smartphones, and tablets.

BACKGROUND

Portable personal electronic devices have become ubiquitous, and are used by many individuals on a daily basis. Such personal electronic devices may include mobile phones, smartphones, and tablet computers. It is estimated that 5 billion people worldwide have mobile devices. Individuals use such devices to access a variety of mobile applications such as, social media applications, online video and audio streaming applications, and mobile gaming applications. In addition, listening devices, such as, for example, wireless headphones which operate using device to device connection protocols such as, for example, Bluetooth® connection protocol, have become popular. Using a connection protocol, wireless headphones can be paired with a personal electronic device to enable audio playing on the personal electronic device to be wirelessly transmitted to the wireless headphones, and create an individualized listening experience for a user. The wireless headphones include, for example, in-ear wireless headphones, also referred to herein as earbuds.

Portable personal electronic devices and wireless headphones typically come equipped with rechargeable battery technology such that a user need not replace their batteries when they become discharged. Such battery technology can be recharged using battery chargers, such as, for example, wall outlet chargers and portable charging devices. However, such portable charging devices are typically cumbersome, are limited to charging single devices and/or include a cable connecting the portable personal electronic device and the portable charging device. Therefore, a need exists for implementing a non-cumbersome and versatile recharging device.

SUMMARY

Illustrative embodiments of the invention provide a portability device configured to perform portable recharging of an electronic device and of wireless headphones.

According to an embodiment, an electronic device includes a housing, a male connector disposed on the housing, and a battery in the housing and electrically connected to the male connector. At least one cavity is formed in the housing, wherein a portion of the cavity includes a contact electrically connected to the battery. The male connector is configured for connecting to a second electronic device, and the at least one cavity is configured for receiving an in-ear wireless headphone. The battery is configured for simultaneously charging the second electronic device and the in-ear wireless headphone when the second electronic device is connected to the electronic device via the male connector, and the in-ear wireless headphone is positioned in the cavity.

The male connector can comprise, for example, a male micro-USB connector, a male USB-mini connector, a male USB-C connector, or a male lightning connector.

The electronic device can further comprise a female connector electrically connected to the battery, wherein the battery is configured to be charged via a source of electrical power connected through the female connector. The power source can be an outlet or another device that supplies power. The female connector can be disposed adjacent the at least one cavity on a side of the housing opposite a side of the housing on which the male connector is disposed. The female connector may be disposed in a protruding portion of the housing.

The at least one cavity may form an opening in a side of the housing opposite a side of the housing on which the male connector is disposed.

BRIEF DESCRIPTION OF THE DRAWINGS

FIG. 1 shows a right side view of a charging device in accordance with an embodiment.

FIG. 2 shows a front view of the charging device in accordance with an embodiment.

FIG. 3 shows a bottom view of the charging device in accordance with an embodiment.

DETAILED DESCRIPTION

Figure 5:
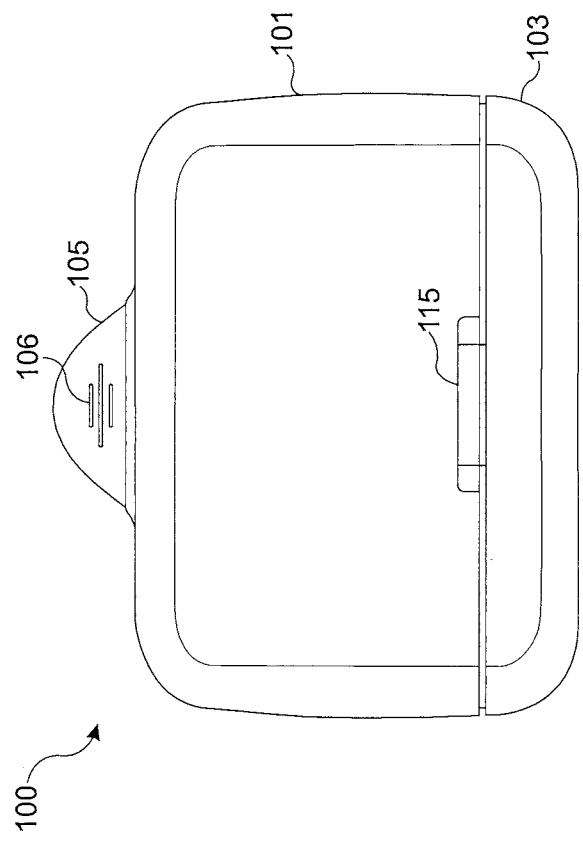
FIG. 5 shows a back view of the charging device in accordance with an embodiment.
Figure 6:
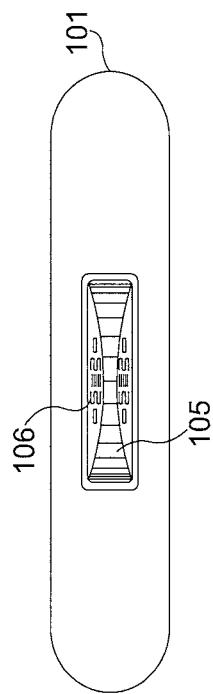
FIG. 6 shows a top view of the charging device in accordance with an embodiment.
Figure 4:
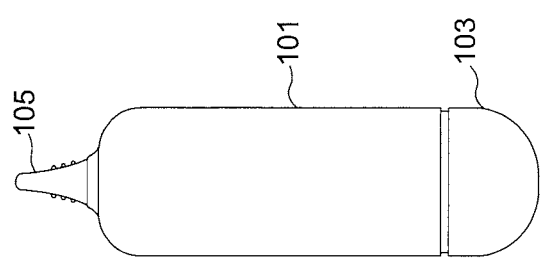
FIG. 4 shows a left side view of the charging device in accordance with an embodiment.

A need exists for a non-cumbersome, portable charging device that can recharge portable personal electronic devices as well as wireless headphones, while maintaining a hands-free user experience. As detailed herein, one or more embodiments of the invention allow for a portable electronic device that can perform simultaneous recharging of a personal electronic device and wireless earbuds.

FIGS. 1-8, 9A and 11-14 illustrate a device 100, which comprises a housing 101. A male connector 107 is disposed on the housing 101 and integrated with the housing 101. The male connector 107 comprises, for example, a male micro-USB connector, a male USB-mini connector, a male USB-C connector, a male lightning (Apple®) connector or other type of portable device connector. According to an embodiment, the male connector 107 is covered by a cap 105 comprising raised portions 106 which facilitate gripping of the cap 105 in order for a user to remove and/or replace the cap 105. The cap 105 can be made of, for example, rubber or plastic.

Figure 11:
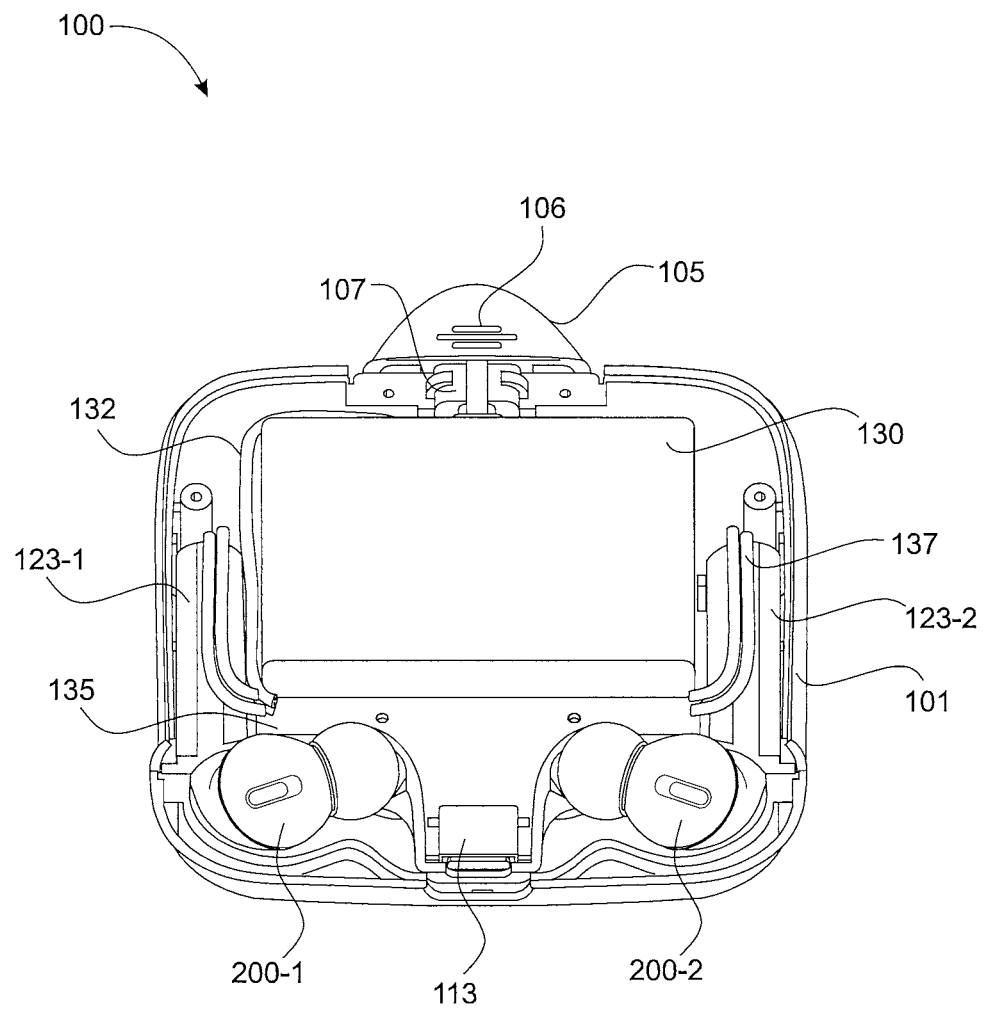
FIG. 11 is a schematic front cross-sectional view of a charging device in accordance with an embodiment.
Figure 12:
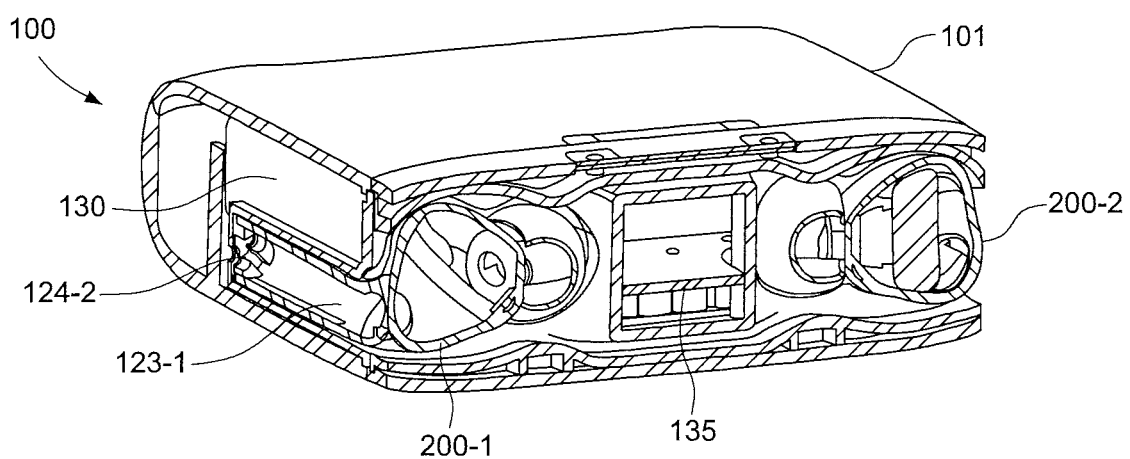
FIG. 12 is a schematic bottom cross-sectional view of the charging device in accordance with an embodiment.
Figure 13:
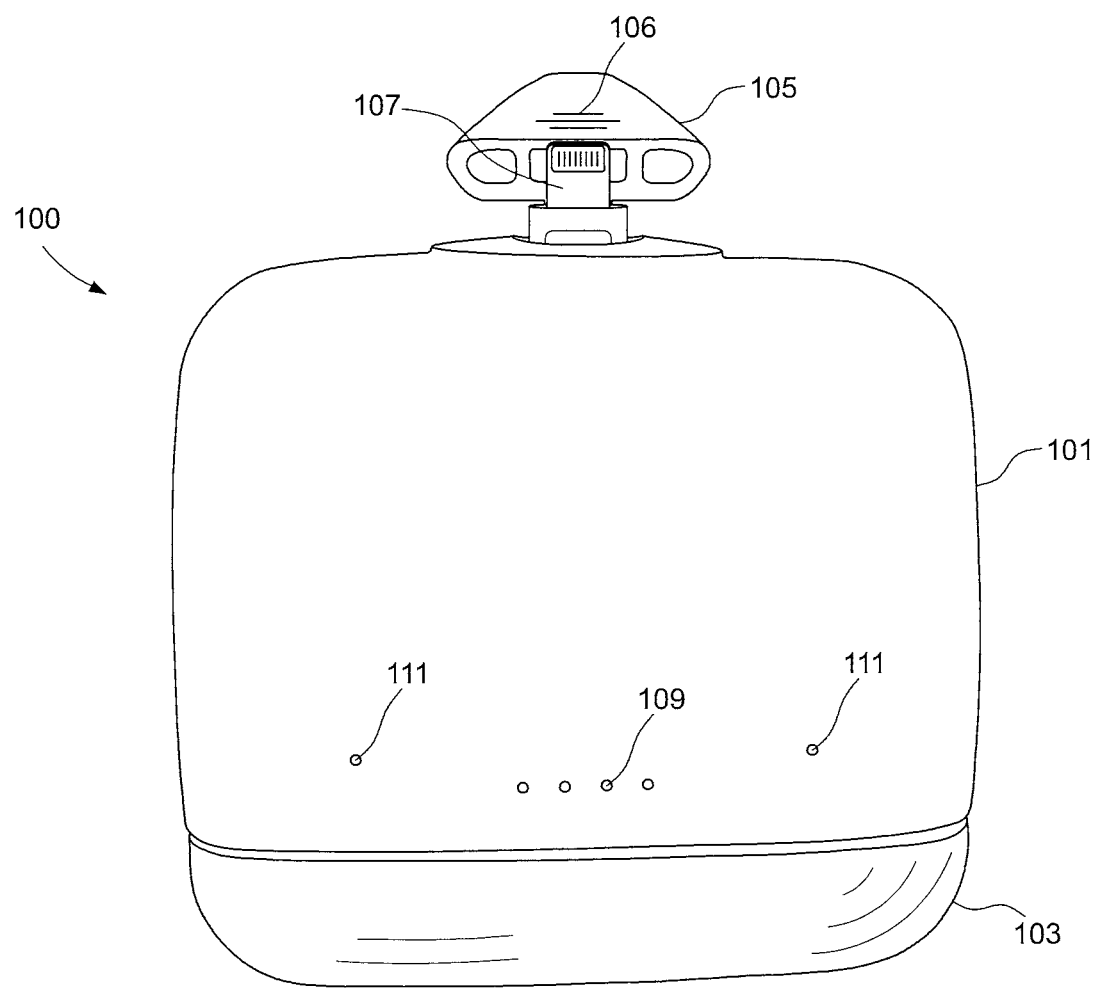
FIG. 13 shows a front view image of the charging device in accordance with an embodiment.
Figure 14:
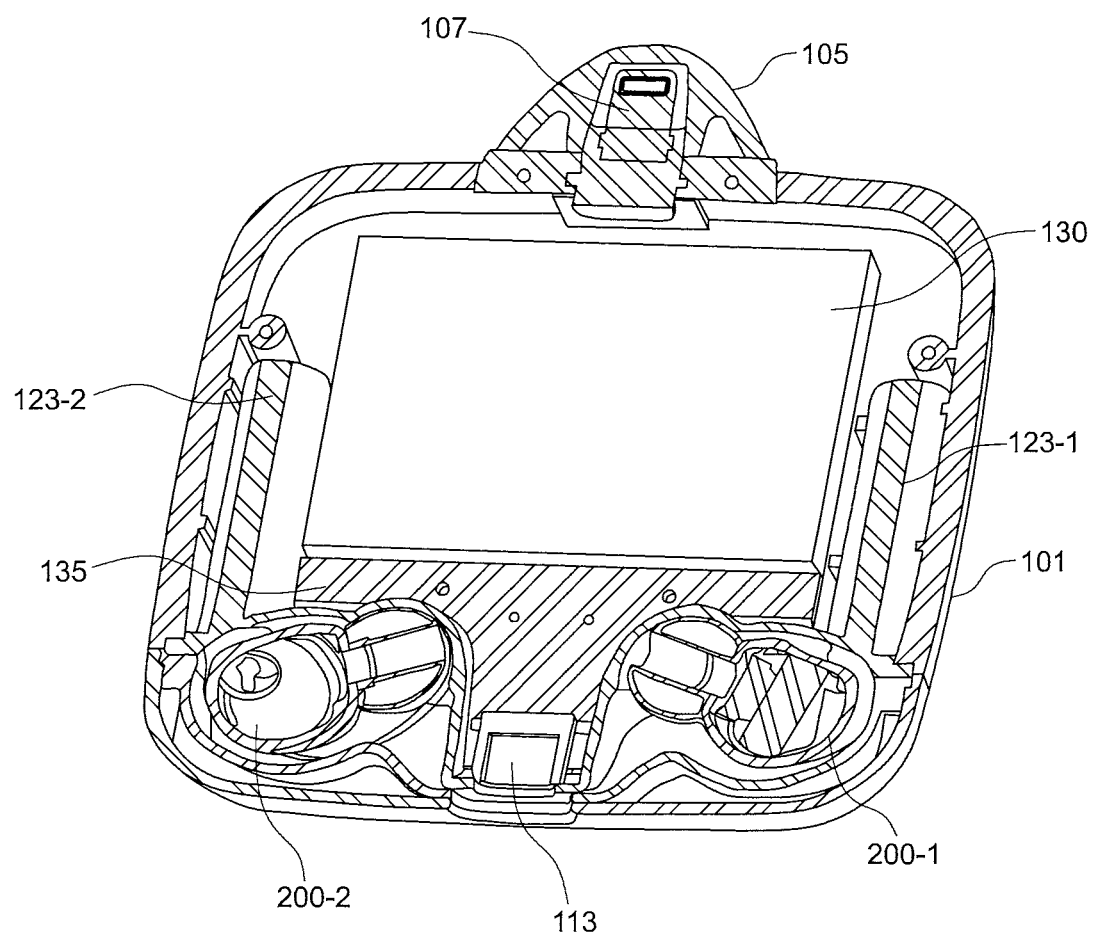
FIG. 14 is a schematic front cross-sectional view of the charging device in accordance with an embodiment.

Referring to FIGS. 11, 12 and 14, a rechargeable battery 130 is disposed in the housing 101, and is electrically connected to the male connector 107. The male connector 107 is configured for being inserted into a female connector of a second electronic device, including but not necessarily limited to, a mobile phone, smartphone or a tablet. When connected to the device 100 via the male connector 107, the battery 130 can charge a battery of the second electronic device.

Figure 8:
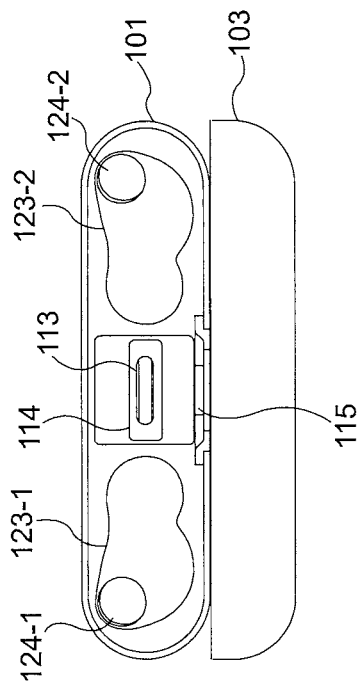
FIG. 8 shows a bottom view of the charging device with an open lid in accordance with an embodiment.
Figures 9A, 9B:
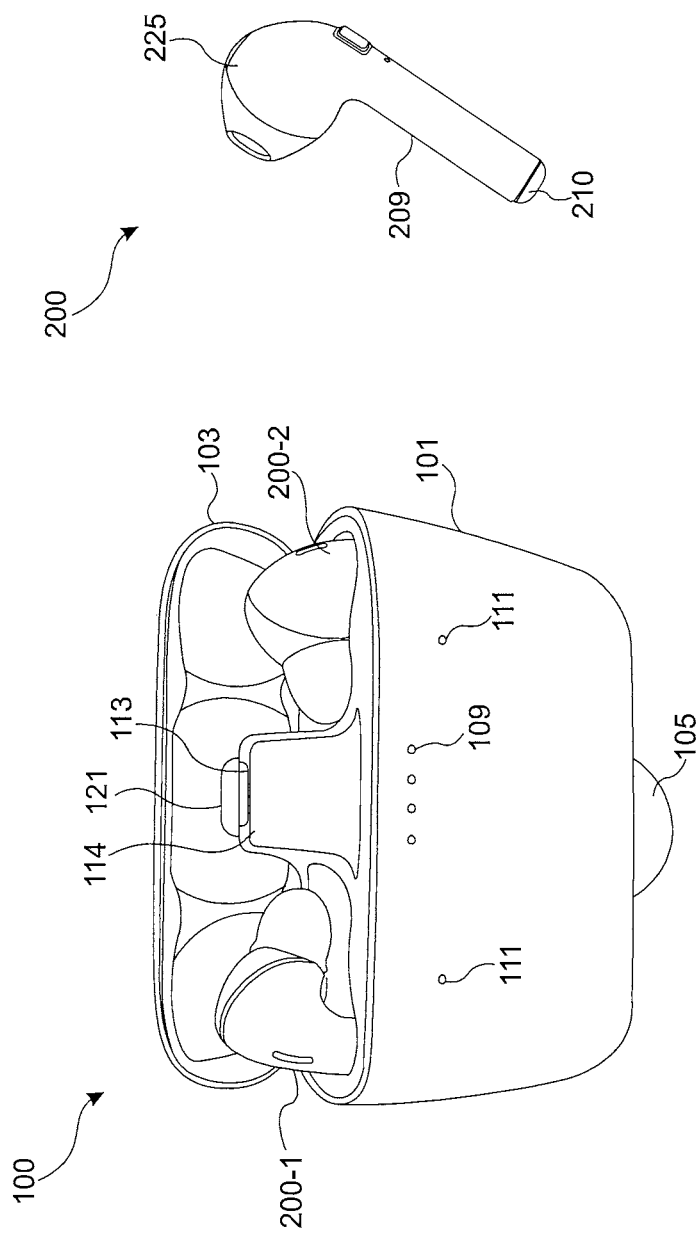
FIG. 9A shows an inverted front perspective view of the charging device with an open lid in accordance with an embodiment.
FIG. 9B shows in-ear wireless headphones in accordance with an embodiment.
Figure 10:
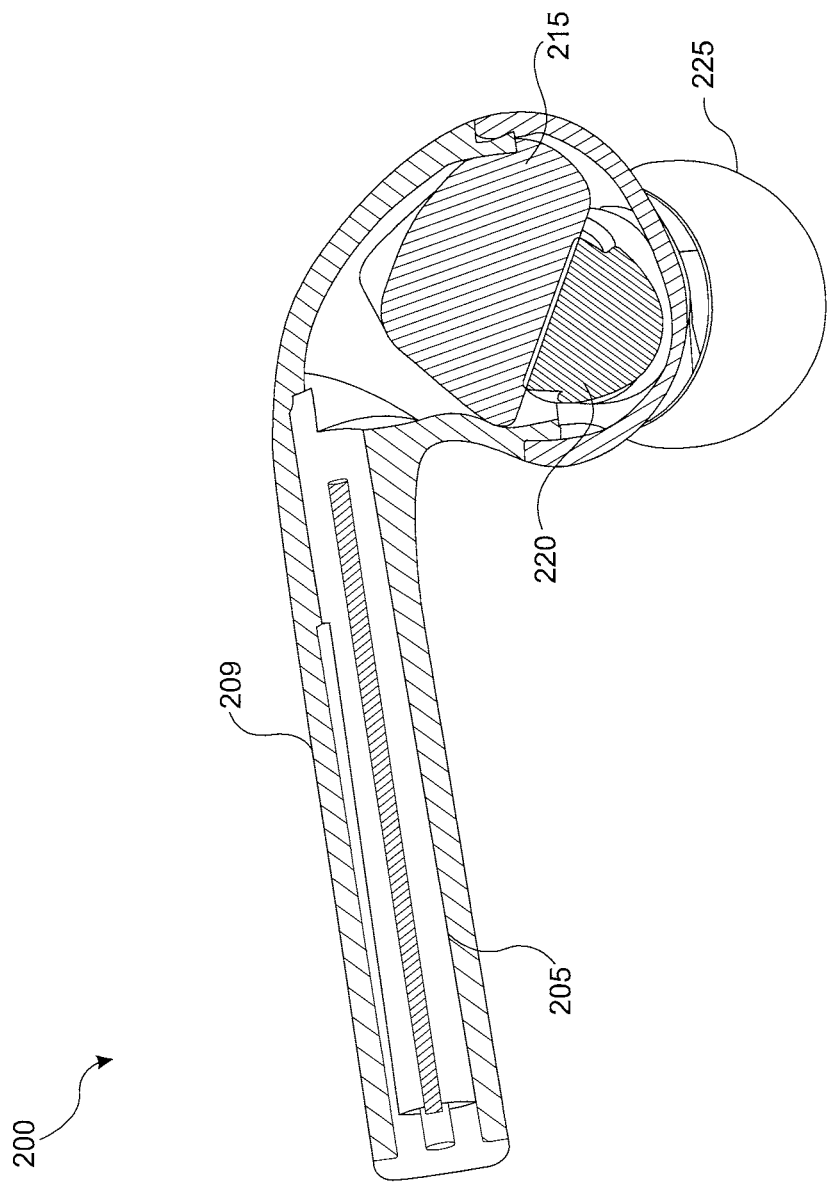
FIG. 10 is a schematic cross-sectional view of an in-ear wireless headphone in accordance with an embodiment.

As can be seen in FIGS. 8 and 9A, the device 100 further includes two cavities 123-1 and 123-2 in the housing 101. The two cavities 123-1 and 123-2 are configured for receiving earbuds 200-1 and 200-2. Referring to FIGS. 10, 11 and 12, a bottom portion of each of the cavities 123-1 and 123-2, such as a bottom surface of each cavity 123-1 and 123-2 includes an electrically conductive contact 124-1 and 124-2 disposed thereon. The contacts 124-1 and 124-2 are electrically connected to the battery 130 via, for example, electrically conductive wires 137 running between the contacts 124-1 and 124-2 and a printed circuit board assembly (PCBA) 135 and electrically conductive wires 132 running between the battery 130 and the PCBA 135.

The battery 130 is configured for charging the earbuds (in-ear wireless headphones) 200-1 and 200-2 when the earbuds 200-1 and 200-2 are positioned in the cavities 123-1 and 123-2 and electrically connected to the contacts 124-1 and 124-2 via, for example, electrically conductive contacts 210 at the bottom of a stem portion 209 of an earbud 200. The battery 130 charges a battery 205 of an earbud 200, which is electrically connected to the contact 210. A battery 205 of an earbud is positioned, for example, in a stem portion 209 of the earbud 200.

Figure 7:
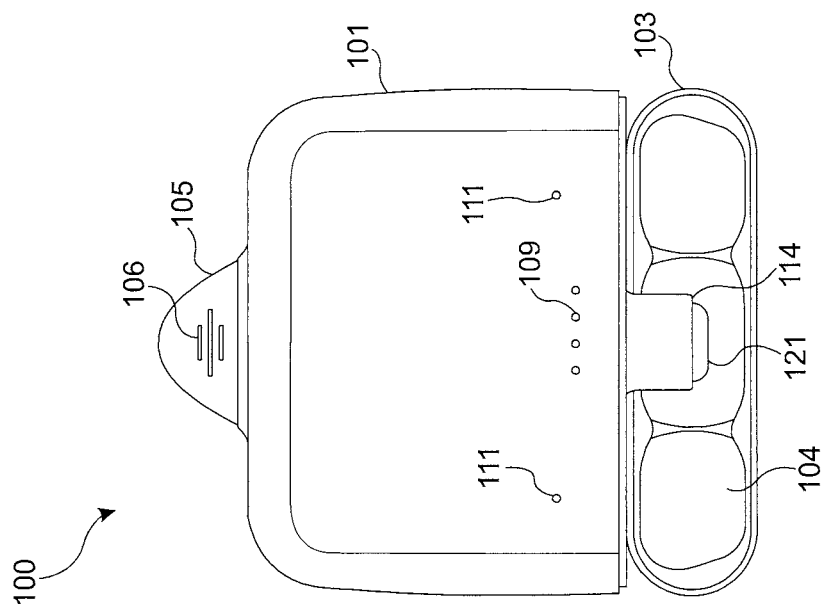
FIG. 7 shows a front view of the charging device with an open lid in accordance with an embodiment.

The housing 101 includes a lid 103 at a bottom portion thereof. The lid 103 is attached to the housing 101 via a hinge structure 115, which enables the lid 103 to be opened and closed. As can be seen in FIGS. 7, 8 and 9A, when in an open position, the lid 103 provides access to the cavities 123-1 and 123-2 so that the earbuds 200-1 and 200-2 can be inserted and removed from the housing 101.

The device 100 further comprises a female connector 113 electrically connected to the battery 130 via the PCBA 135 and one or more of the wires 132. The female connector 113 is configured for receiving, for example, a male micro-USB connector, a male USB-mini connector, a male USB-C connector, a male lightning connector, or other type of connector that is connected to a power source, such as, for example, a standard household outlet providing 15 amperes (amps) of current and 120 volts. The male connector inserted into the female connector 113 may be connected to the power source via an electrical wire plugged into a universal serial bus (USB) adaptor that is plugged into the standard household wall outlet. The battery 130 of the device 100 is able to be charged via the female connector 113 when connected to the power source.

According to an embodiment, as can be seen in FIGS. 7, 8 and 9, the female connector 113 is disposed within a pedestal portion 114 protruding from the housing 101 and disposed between the cavities 123-1 and 123-2. The female connector 113 and pedestal portion 114 are disposed on a side of the housing 101 opposite a side of the housing 101 on which the male connector 107 is disposed. The cavities 123-1 and 123-2 form openings in a side of the housing 101 opposite a side of the housing 101 on which the male connector 107 is disposed.

The lid 103 includes a hole 121 which permits access to the female connector 113 when the lid 103 is in a closed position. The lid 103 includes a hollow portion 104 having a depth greater than the pedestal portion 114 to permit closing of the lid 103.

The device 100 further includes a plurality of light emitting diodes (LEDs) 109 and 111 on the front surface of the housing 101. The LEDs 109 and 111 are electrically connected to the PCBA 135 and are connected to circuitry in the PCBA 135 to enable the LEDs 109 to indicate a charge status of the battery 130, and the LEDs 111 to indicate a charge status of earbuds 200-1 and 200-2. For example, the charge status of the battery 130 can be indicated by a number of the LEDs 109 that are lit at a given time and/or by the color of the LEDs 109. The number of LEDs 109 that are lit is proportional to the amount of charge of the battery 130 (e.g., less lit LEDs 109=less charge, and more lit LEDs 109=more charge). In addition or as an alternative to indicating charge status with the number of lit LEDs 109, a color of the LEDs 109 may indicate an amount of charge for the battery 130 (e.g., green/blue—75-100% charged, yellow—25-50% charged, red—0-25% charged). The LEDs 111 can indicate whether the earbuds 200-1 and 200-2 are charging and/or a charge state of the earbuds 200-1 and 200-2. For example, if the LEDs 111 are lit, that indicates that the earbuds 200-1 and 200-2 are charging. In addition, or alternatively, similar to the color scheme described in connection with the LEDs 109, a color of the LEDs 111 can indicate the amount of charge of the earbuds 200-1 and 200-2. Other indicators besides LEDs may be used.

In operation, the male connector 107 may be connected to a second electronic device (e.g., smartphone, tablet or other rechargeable portable personal electronic device) at the same time that earbuds 200-1 and 200-2 are inserted into the cavities 123-1 and 123-2. In this case, the device 100 via the PCBA 135, is configured for having the battery 130 simultaneously charge the connected second electronic device and the earbuds 200-1 and 200-2. Alternatively, a second electronic device can be connected to the device 100 via the male connector 107 at a different time than when the in-ear wireless headphones 200-1 and 200-2 are inserted into the cavities 123-1 and 123-2. In this case, the second electronic device and the earbuds 200-1 and 200-2 are charged when no other devices are being charged.

In addition, as described above, a power source can be connected to the device via the female connector 113. The power source (e.g., from a wall outlet or other charging device) can be connected to the device 100 while the earbuds 200-1 and 200-2 are in the cavities 123-1 and 123-2 and charging, and/or while the second electronic device is connected to the device 100 via the male connector 107 and charging. The device is configured via the PCBA 135 to have pass through technology, such that using the power source, the battery 130 can be recharging while a connected second device and/or inserted earbuds are also being charged.

According to an embodiment, the PCBA 135 includes load balancing circuitry and power regulating circuits to transfer power from the power source to the battery 130 and to the connected second device and/or the inserted earbuds 200-1 and 200-2. As can be understood, the device 100 is a portable charging device that can be used to charge other devices and to charge inserted wireless headphones while not connected to (e.g., plugged into) a power source, or while connected to (plugged into) a power source.

Referring to FIG. 10, an in-ear wireless headphone (earbud) 200 includes a stem portion 209, a rechargeable battery 205 in the stem portion 209, and an electrical connector (contact) 210 at a bottom of the stem portion 209, which is connected to the battery 205, so that the battery 205 in the earbud 200 can be charged. The battery 205 is charged via the contact 210, which connects to a contact 124 at the bottom of a cavity 123 in the device 100. The earbud 200 further includes circuitry 215 and a driver 220 which extends ear portion 225. The driver 220 can include a magnet and a speaker diaphragm. The circuitry 215 includes controlling circuitry for operating the earbud 200 and recharging capabilities.

Figure 15:
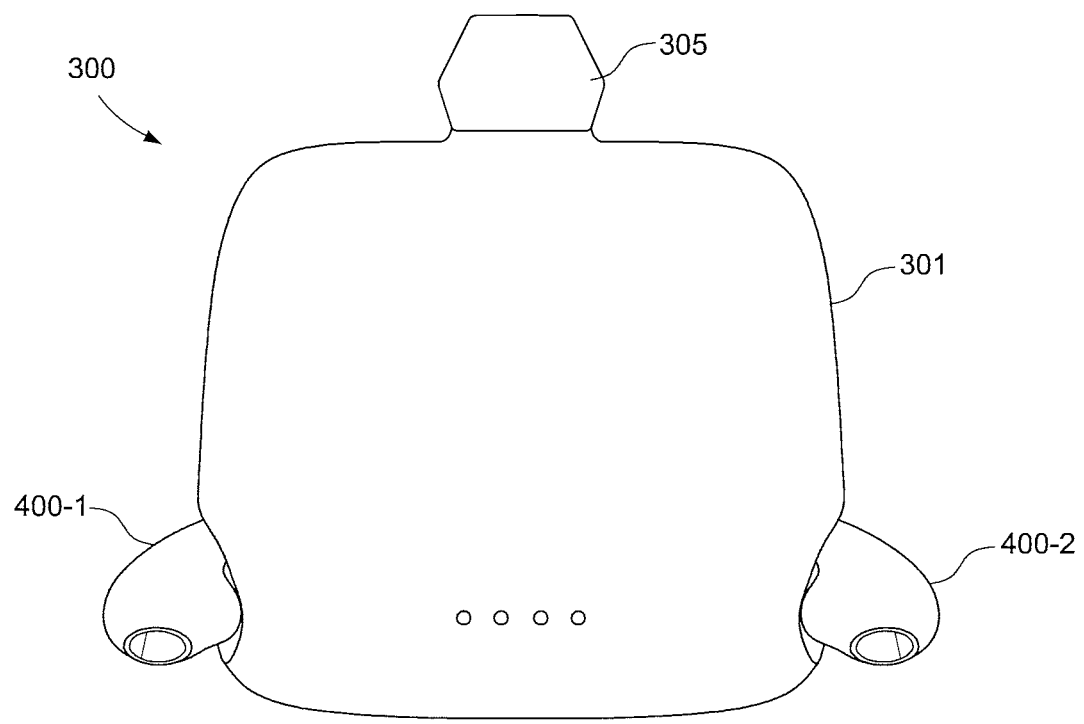
FIG. 15 shows a front view image of a charging device in accordance with another embodiment.
Figure 16:
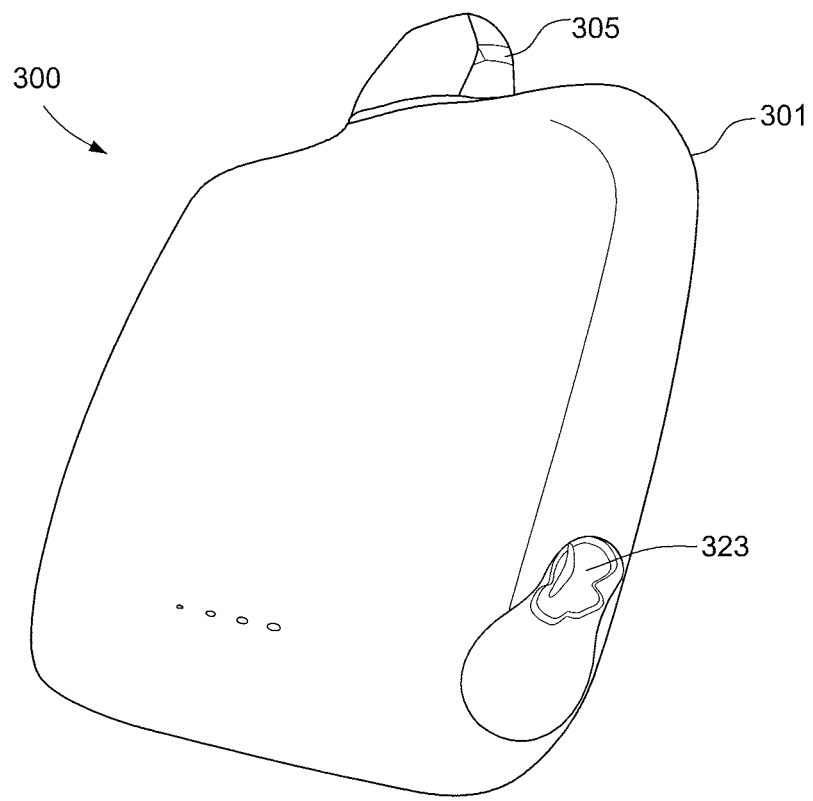
FIG. 16 shows a left side perspective view image of the charging device in accordance with the other embodiment.

FIGS. 15 and 16 illustrate another embodiment of a portable charging device 300, which includes a housing 301, and a cap 305, under which is a male connector (not shown) similar to male connector 107. In the device 300, there is no lid, and instead earbuds 400-1 and 400-2 are inserted into cavities 323 on sides of the housing 301, and protrude slightly from the housing 301 when inserted as shown in FIG. 15. According to an embodiment, the device 300 has the same or similar internal components (e.g., battery and PCBA) as the device 100 and the same or similar functionality as the device 100 (e.g., recharging of connected devices and inserted earbuds and pass through technology) as described herein above. Similar reference numerals between the devices 100 and 300 refer to the same or similar components.

In an embodiment, the portable recharging devices 100 and 300 maintain portability features such that, in a non-limiting example, the portable recharging devices 100 and 300 are small enough to fit in one's pocket for storage.

Although one male connector 107 and one female connector 113 are shown, the embodiments are not necessarily limited thereto. The devices 100 and 300 may include more than one male and/or female connectors for different types of connections. For example, the devices 100 can include male and female connectors for both Android® and Apple® portable devices.

The caps 105 and 305 mate with their respective housings 101 and 301 for storage purposes and to protect covered male connectors from damage. In accordance with one or more embodiments, the battery 130 is configured to be recharged with suitable power requirements, such as, by non-limiting example, recharging with at least 5V and 1.3 A, which would recharge the battery 130 in approximately 75 minutes. Such a capability allows the portable recharging devices 100 and 300 to be reused multiple times, such as, for example, over 1,000 times.

According to one or more embodiments of the present invention, the battery 130 has a capacity to fully recharge the battery of a connected electronic device, as well as the battery of inserted earbuds. By non-limiting example, the battery 130 of the portable recharging device 100 can be 1800 mAh-3600 mAh. The battery 130 is configured to recharge an electronic device and/or inserted earbuds with suitable power requirements, such as, by non-limiting example, the portable recharging device 100 or 300 outputting at least 5V and 1.7 A.

Although exemplary embodiments of the present invention have been described hereinabove, it should be understood that the present invention is not limited to these embodiments, but may be modified by those skilled in the art without departing from the spirit and scope of the present invention.

What is claimed is:

1. An electronic device, comprising:
   a housing comprising a shape having a first side, a second side, a third side and a fourth side, wherein the first side is opposite the second side, the third side is opposite the fourth side, and the third and fourth sides connect the first and second sides;
   a male connector disposed on and protruding from the first side of the housing;
   a battery in the housing and electrically connected to the male connector;
   at least two cavities in the housing configured for receiving a first in-ear wireless headphone and a second in-ear wireless headphone, respectively, wherein:
      a portion of a first cavity of the at least two cavities includes a first contact electrically connected to the battery;
      a portion of a second cavity of the at least two cavities includes a second contact electrically connected to the battery;
      the first cavity comprises a first opening in the second side of the housing; and
      the second cavity comprises a second opening in the second side of the housing; and
      a female connector disposed in a protruding portion, wherein the protruding portion is disposed on the second side of the housing between the first and second openings and is electrically connected to the battery;
   wherein the battery is disposed in the housing between the male connector and the female connector, and between the first contact and second contact;
   wherein the female connector is configured to charge the battery via a source of electrical power connected through the female connector; and
   wherein the male connector is configured for connecting to a second electronic device, and the battery is configured for charging the second electronic device when the second electronic device is connected to the electronic device via the male connector and the second electronic device is external to the housing.

2. The electronic device according to claim 1, wherein the male connector comprises one of a male micro-USB connector, a male USB-mini connector, a male USB-C connector, and a male lightning connector.

3. The electronic device according to claim 1, wherein the battery is configured for charging the first and second in-ear wireless headphones when the first and second in-ear wireless headphones are positioned in the at least two cavities and electrically connected to the first and second contacts.

4. The electronic device according to claim 1, wherein:
   the battery is configured for simultaneously charging the second electronic device and the first and second in-ear wireless headphones when the second electronic device is connected to the electronic device via the male connector, and the first and second in-ear wireless headphones are positioned in the at least two cavities.

5. The electronic device according to claim 1, wherein the electronic device is portable.

6. The electronic device according to claim 1, wherein:
   the first cavity extends along the third side; and
   the second cavity extends along the fourth side.

7. The electronic device according to claim 1, wherein the male connector is covered by a removable cap when the second electronic device is not connected to the electronic device via the male connector.

8. The electronic device according to claim 1, further comprising a lid attached to the housing at the second side via a hinge.

9. The electronic device according to claim 8, wherein, when in an open position, the lid provides access to the at least two cavities.

10. The electronic device according to claim 8, wherein the lid includes a hole which permits access to the female connector when the lid is in a closed position.

11. The electronic device according to claim 8, wherein the lid includes a hollow portion having a depth greater than a height of the protruding portion to permit closing of the lid.

12. An electronic device, comprising:
a housing comprising a shape having a first side, a second side, a third side and a fourth side, wherein the first side is opposite the second side, the third side is opposite the fourth side, and the third and fourth sides connect the first and second sides;
a male connector coupled to the first side of the housing;
a battery in the housing and electrically connected to the male connector;
at least two cavities in the housing configured for receiving a first in-ear headphone device and a second in-ear headphone device, respectively;
a first contact at a bottom of a first cavity of the at least two cavities, and a second contact at a bottom of a second cavity of the at least two cavities, wherein the first and second contacts are electrically connected to the battery, the first cavity comprises a first opening in the second side of the housing, and the second cavity comprises a second opening in the second side of the housing; and
a female connector disposed in a protruding portion, wherein the protruding portion is disposed on the second side of the housing between the first and second openings and is electrically connected to the battery;
wherein the battery is disposed in the housing between the male connector and the female connector, and between the first contact and second contact;
wherein the female connector is configured to charge the battery via a source of electrical power connected through the female connector; and
wherein the male connector is configured for connecting to a second electronic device, and the battery is configured for charging the second electronic device when the second electronic device is connected to the electronic device via the male connector and the second electronic device is external to the housing.

13. The electronic device according to claim 12, wherein the battery is configured for charging the first and second in-ear headphone devices when the first and second in-ear headphone devices are positioned in the at least two cavities and electrically connected to the first and second contacts.

14. The electronic device according to claim 12, wherein:
the battery is configured for simultaneously charging the second electronic device and the first and second in-ear headphone devices when the second electronic device is connected to the electronic device via the male connector, and first and second in-ear headphone devices are positioned in the at least two cavities.

15. The electronic device according to claim 12, wherein:
the first cavity extends along the third side; and
the second cavity extends along the fourth side.

16. The electronic device according to claim 12, wherein the male connector is covered by a removable cap when the second electronic device is not connected to the electronic device via the male connector.

17. The electronic device according to claim 12, further comprising a lid attached to the housing at the second side via a hinge.

18. The electronic device according to claim 17, wherein, when in an open position, the lid provides access to the at least two cavities.

19. The electronic device according to claim 17, wherein the lid includes a hole which permits access to the female connector when the lid is in a closed position.

20. The electronic device according to claim 17, wherein the lid includes a hollow portion having a depth greater than a height of the protruding portion to permit closing of the lid.

* * * * *